United States Patent
Ichikawa

(10) Patent No.: US 6,373,801 B2
(45) Date of Patent: *Apr. 16, 2002

(54) ROTATION NUMBER CONTROL DEVICE FOR A DISK SIGNAL REPRODUCTION APPARATUS

(75) Inventor: Katsumi Ichikawa, Osaka (JP)

(73) Assignee: Funai Electric Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,327

(22) Filed: May 5, 1999

(30) Foreign Application Priority Data

May 8, 1998 (JP) .......................................... 10-126363

(51) Int. Cl.[7] ................................................. G11B 7/00
(52) U.S. Cl. ................................... 369/53.18; 369/53.3
(58) Field of Search ........................... 369/53.14, 53.18, 369/53.3, 47.39; 360/73.03

(56) References Cited

U.S. PATENT DOCUMENTS 5,862,113 A * 1/1999 Tsuyuguchi et al.
5,886,966 A * 3/1999 Ota et al.
6,016,296 A * 1/2000 Kim

FOREIGN PATENT DOCUMENTS

| JP | 7-184386 | 7/1995 |
| JP | 8-106714 | 4/1996 |

* cited by examiner

Primary Examiner—W. R. Young
(74) Attorney, Agent, or Firm—Morgan, Lewis & Bockius LLP

(57) ABSTRACT

A rotation number control device for a disk signal reproduction apparatus that reproduces information using a disk on which the information is recorded along a spiral track, such as an optical disk or a magnetic disk. The rotation number control device includes a drive unit which rotates a disk, a rotation number detection unit which detects the rotation number of the disk, a rotation number control unit which controls the rotation number of the disk rotated by the drive unit, a vibration detection unit which detects vibration due to rotation of the disk, and a rotation number storage unit which, for each disk, stores a rotation number of the disk at a time when maximum vibration in a disk allowable vibration range is produced during rotational acceleration of the disk, as a maximum allowable rotation number. The rotation number of the disk is controlled so as not to exceed the maximum allowable rotation number of the disk which is stored in the rotation number storage unit.

3 Claims, 2 Drawing Sheets

ROTATION NUMBER CONTROL DEVICE FOR A DISK SIGNAL REPRODUCTION APPARATUS

BACKGROUND OF THE INVENTION

1. Field of the Invention

The present invention relates to a rotation number control device for a disk signal reproduction apparatus that reproduces information using a disk-like recording medium on which the information is recorded along a spiral track, such as an optical disk or a magnetic disk.

2. Description of the Related Art

In a conventional apparatus, preferably, an information signal on a disk-like recording medium such as an optical disk or a magnetic disk is read out at a speed which is as high as possible. In such a conventional apparatus, when a disk is rotated at a high speed, undesired vibration of a spindle motor causes mechanical vibration, so that the information signal on the disk is erroneously read out or on occasion cannot be read. In order to solve this problem, Japanese Patent Unexamined Publication No. Hei. 7-184386 discloses a technique in which "vibration of a spindle motor is directly or indirectly detected, and the driving waveform of the spindle motor is corrected on the basis of the detected vibration, thereby suppressing the vibration of the spindle motor" (column 0009 of the publication), and a technique in which "the driving waveform of a spindle motor is corrected, thereby suppressing the vibration of the spindle motor, and also a driving signal of a recording/reproducing head is corrected on the basis of the vibration of the spindle motor" (column 0012 of the publication). Further, Japanese Patent Unexamined Publication No. Hei. 8-106714 discloses "a spindle motor driving device in which mechanical vibration produced by a spindle motor when the spindle motor is adjusted into a predetermined rotation number is reduced, deviation out of focus and tracking servo controls is prevented from occurring, and the operation of adjustment into the predetermined rotation number is surely conducted" (column 0016 of the publication).

In such a conventional device, when a certain standard disk is mounted, undesired vibration of a spindle motor causes mechanical vibration as the rotation number of the disk becomes higher, and therefore a technique of solving this problem is disclosed. However, in each actual disk such as a music disk or a CD-ROM disk, the vibration state of the disk is varied by deviation in the position of the center hole, the thickness, and the mass eccentricity of the disk.

Further, the rotation number at which such vibration starts to occur is dispersed depending on individual disks. Each time when a disk is replaced with another one, therefore, the rotation number at which vibration starts to occur must be detected for each disk. However, any countermeasure for the above is not taken in the conventional device.

SUMMARY OF THE INVENTION

The invention has been made in order to solve the above-discussed problems. Depending on individual disks, the vibration state of a disk is varied by deviation in the position of the center hole, the thickness, and the mass eccentricity of the disk, and the rotation number at which such vibration starts to occur is dispersed. Therefore, it is an object of the invention to provide a rotation number control device in which, each time when a disk is replaced with another one, the rotation number at which vibration starts to occur is detected for each disk, the rotation number of the disk at a time when maximum vibration in a disk allowable vibration range is produced, is set as a maximum allowable rotation number, and the rotation number of the disk is controlled so as not to exceed the maximum allowable rotation number for each disk.

In order to achieve the above object, according to a first aspect of the invention, there is provided a rotation number control device for a disk signal reproduction apparatus, comprising: a disk drive unit that rotates a disk on which information is recorded along a spiral track; a rotation number detection unit which detects a rotation number of the disk; a rotation number control unit which controls the rotation number of the disk rotated by the disk drive unit; a vibration detection unit which detects vibration of the disk or a spindle motor and due to rotation of the disk; and a rotation number storage unit which, for each disk, stores a rotation number of the disk at a time when maximum vibration in a disk allowable vibration range is produced during rotational acceleration of the disk, as a maximum allowable rotation number, wherein the rotation number of the disk is controlled so as not to exceed the maximum allowable rotation number of the disk which is stored in the rotation number storage unit.

According to a second aspect of the invention, there is provided a rotation number control device for a disk signal reproduction apparatus, comprising: a disk drive unit that rotates a disk on which information is recorded along a spiral track; a rotation number detection unit which detects a rotation number of the disk; a rotation number control unit which controls the rotation number of the disk rotated by the disk drive unit; a vibration detection unit which detects vibration of the disk or a spindle motor and due to rotation of the disk; a rotation number storage unit which, for each disk, stores a rotation number of the disk at a time when maximum vibration in a disk allowable vibration range is produced during rotational acceleration of the disk, as a maximum allowable rotation number; and a central processing unit which receives an output of the rotation number storage unit, a detection output of the rotation number detection unit, and a detection output of the vibration detection unit, wherein the rotation number of the disk is controlled so as not to exceed the maximum allowable rotation number of the disk which is stored in the rotation number storage unit, by the central processing unit.

DETAILED DESCRIPTION OF THE PREFERRED EMBODIMENT

Hereinafter, an embodiment of the invention will be described with reference to the accompanying drawings.

Figure 1:
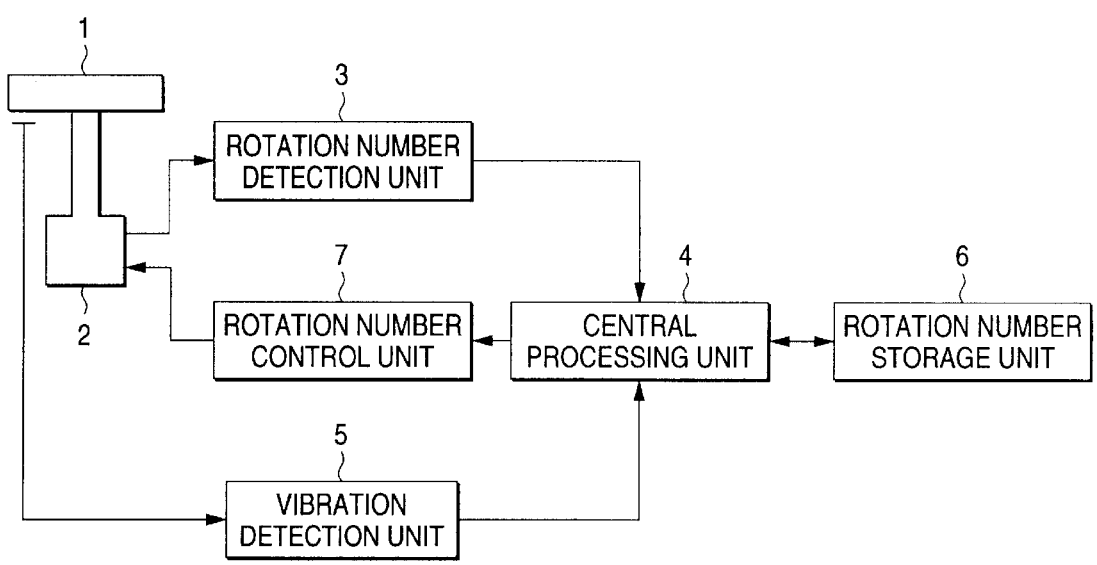
FIG. 1 is a block diagram of a rotation number control device for a disk signal reproduction apparatus according to the invention.

FIG. 1 is a block diagram of a rotation number control device for a disk signal reproduction apparatus according to the invention. A disk 1 is driven by a driving device 2 such as a spindle motor. A rotation number detection unit 3 detects the rotation number of the disk 1 (per unit time), and the detected rotation number is supplied to a central processing unit 4. A vibration detection unit 5 configured by a vibration detection sensor detects vibration of the disk 1 or that of the driving device 2 such as a spindle motor, and the detected vibration is supplied to the central processing unit 4. A rotation number storage unit 6 stores the rotation number of the disk (per unit time) at a time when maximum vibration in an allowable vibration range where a disk signal can be read out is produced during acceleration of the disk, as a maximum allowable rotation number. Thereafter, the rotational driving by the spindle motor 2 is controlled by the central processing unit 4 and a rotation number control unit 7 so that the rotation number of the disk is not higher than the maximum allowable rotation number.

Figure 2:
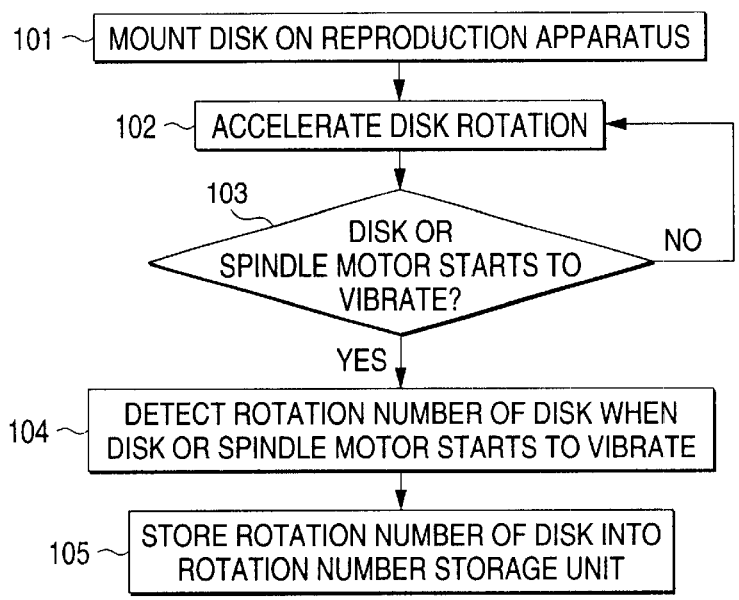
FIG. 2 is a flowchart showing an operation of setting a maximum allowable rotation number of a disk in the rotation umber control device for a disk signal reproduction apparatus according to the invention.

FIG. 2 is a flowchart showing an operation of, in the rotation number control device for a disk signal reproduction apparatus according to the invention, setting the maximum allowable rotation number when vibration of the disk reaches the maximum vibration in the allowable vibration range of the disk. First, the disk 1 is mounted on the disk signal reproduction apparatus (step 101). Then, the rotation of the disk is accelerated (step 102), and it is checked whether the disk or the spindle motor starts to vibrate or not (step 103). If vibration does not start to occur (No), the rotation of the disk is further accelerated (step 102). If the disk or the spindle motor starts to vibrate (Yes), the rotation number of the disk (per unit time) at the time when the disk or the spindle motor starts to vibrate is stored into the rotation number storage unit 6 as the maximum allowable rotation number (r) (steps 104 and 105).

In this way, each time when a disk is replaced with another one, an optimum maximum allowable rotation number which is suitable to the disk is set during rotational acceleration of the disk. Therefore, the reading operation can be conducted at the highest speed which is suitable to the disk.

Figure 3:
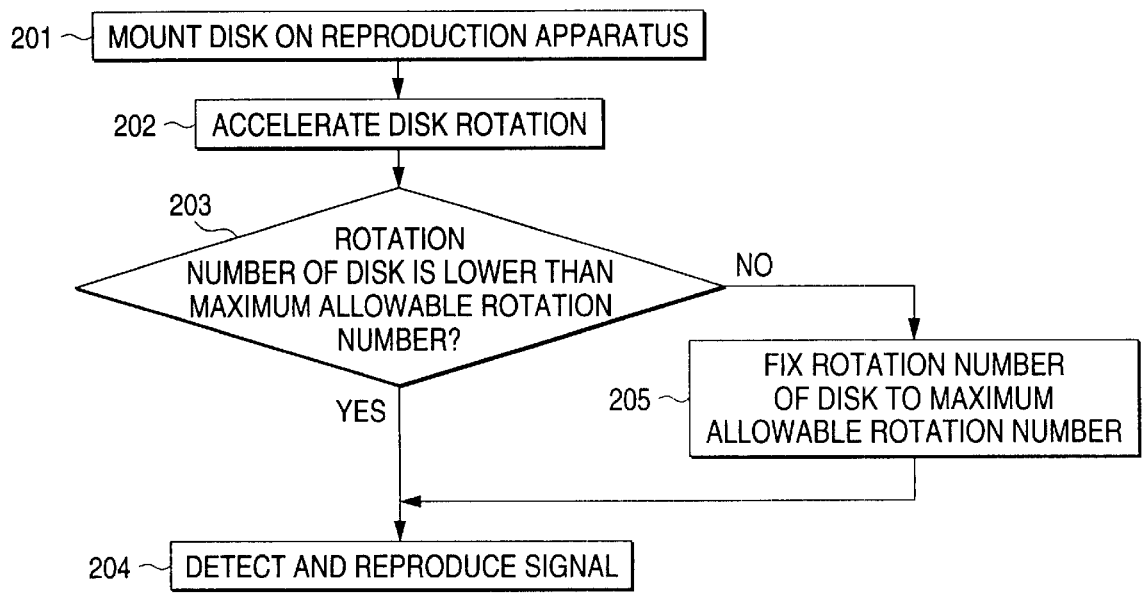
FIG. 3 is a flowchart showing an operation of reproducing a disk signal in the rotation number control device for a disk signal reproduction apparatus according to the invention.

FIG. 3 is a flowchart showing an operation of reproducing a disk signal in the rotation number control device for a disk signal reproduction apparatus according to the invention. First, the disk 1 is mounted on the disk signal reproduction apparatus (step 201). Then, the rotation of the disk is accelerated (step 202), and it is checked whether the rotation number of the disk is lower than the maximum allowable rotation number (r) or not (step 203). If the rotation number is lower (Yes), the signal is detected and then reproduced (step 204). If the rotation number of the disk is not lower than the maximum allowable rotation number (r) (No), the rotation number of the disk is fixed to the maximum allowable rotation number (r) (step 205). In this way, during the disk reproduction operation, the information signal of the disk is detected while the rotation number of the disk (per unit time) is controlled by the central processing unit 4 and the rotation number control unit 7 so as to be equal to or lower than the maximum allowable rotation number (r) which is stored in the rotation number storage unit 6.

As described above, the rotation number control device for a disk signal reproduction apparatus according to the invention includes: a drive unit which rotates a disk; a rotation number detection unit which detects the rotation number of the disk; a rotation number control unit which controls the rotation number of the disk rotated by the drive unit; a vibration detection unit which detects vibration of the disk, a spindle motor, or the like and due to rotation of the disk; and a rotation number storage unit which, for each disk, stores the rotation number of the disk at a time when maximum vibration in a disk allowable vibration range is produced during rotational acceleration of the disk, as a maximum allowable rotation number. The rotation number of the disk is controlled so as not to exceed the maximum allowable rotation number of the disk which is stored in the rotation number storage unit. Furthermore, each time when a disk is replaced with another one, an optimum maximum allowable rotation number which is suitable to the disk is set into the rotation number storage unit during rotational acceleration of the disk. Therefore, a data signal can be reproduced at the highest speed which is suitable to the disk.

What is claimed is:

1. A rotation number control device for a disk signal reproduction apparatus, comprising:

a disk drive unit that rotates a disk on which information is recorded along a spiral track;

a rotation number detection unit which detects a rotation number of the disk;

a rotation number control unit which controls the rotation number of the disk rotated by said disk drive unit;

a vibration detection unit which detects vibration of the disk or a spindle motor and due to rotation of the disk; and a rotation number storage unit which stores a rotation number of the disk only at a time when maximum vibration in a disk allowable vibration range is produced during rotational acceleration of the disk as a maximum allowable rotation number independent of a predetermined maximum rotation number, wherein the rotation number of the disk is controlled so as not to exceed the maximum allowable rotation number of the disk which is stored in said rotation number storage unit.

2. A rotation number control device for a disk signal reproduction apparatus, comprising:

a disk drive unit that rotates a disk on which information is recorded along a spiral track;

a rotation number detection unit which detects a rotation number of the disk;

a rotation number control unit which controls the rotation number of the disk rotated by said disk drive unit;

a vibration detection unit which detects vibration of the disk or a spindle motor and due to rotation of the disk; and a rotation number storage unit which stores a rotation number of the disk only at a time when maximum vibration in a disk allowable vibration range is produced during rotational acceleration of the disk as a maximum allowable rotation number independent of a predetermined maximum rotation number; and a central processing unit which receives an output of said rotation number storage unit, a detection output of said rotation number detection unit, and a detection output of said vibration detection unit, wherein the rotation number of the disk is controlled so as not to exceed the maximum allowable rotation number of the disk which is stored in said rotation number storage unit, by said central processing unit.

3. A rotation number control device for a disk signal reproduction apparatus, comprising:

a disk drive unit to rotate a disk on which information is recorded along a spiral track;

a rotation number detection unit to detect a rotation number of the disk;

a rotation number control unit to control the rotation number of the disk rotated by said disk drive unit;

a vibration detection unit to detect vibration of the disk or a spindle motor and due to rotation of the disk; and a rotation number storage unit to store a maximum allowable rotation number of the disk only at a time when maximum vibration in a disk allowable vibration range is produced during rotational acceleration of the disk, wherein the rotation number of the disk is controlled so as not to exceed the maximum allowable rotation number of the disk which is stored in said rotation number storage unit, and wherein the disk drive unit increases the rotational acceleration of the disk whenever the vibration of the disk is less than the disk allowable vibration range.

* * * * *